US009794507B2

(12) United States Patent
Longet et al.

(10) Patent No.: US 9,794,507 B2
(45) Date of Patent: Oct. 17, 2017

(54) SETTING A FEATURE FROM THE MAIN MENU OF AN APPLICATION

(75) Inventors: Aurélien Longet, Rennes (FR); Thomas Morin, Rennes (FR); Tristan Langlois, Chateaugiron (FR)

(73) Assignee: Thomson Licensing DTV (FR)

( * ) Notice: Subject to any disclaimer, the term of this patent is extended or adjusted under 35 U.S.C. 154(b) by 241 days.

(21) Appl. No.: 13/334,833

(22) Filed: Dec. 22, 2011

(65) Prior Publication Data

US 2012/0167143 A1  Jun. 28, 2012

(30) Foreign Application Priority Data

Dec. 22, 2010  (EP) .................................... 10306489

(51) Int. Cl.
*H04N 5/445* (2011.01)
*H04N 21/482* (2011.01)
(Continued)

(52) U.S. Cl.
CPC ..... *H04N 5/44543* (2013.01); *H04N 5/44582* (2013.01); *H04N 21/42222* (2013.01);
(Continued)

(58) Field of Classification Search
CPC ......... H04N 21/42222; H04N 21/4312; H04N 21/44218; H04N 21/4828; H04N 21/84; H04N 5/44582
(Continued)

(56) References Cited

U.S. PATENT DOCUMENTS

| 5,594,469 | A | * | 1/1997 | Freeman | G05B 19/106 345/157 |
| 5,621,456 | A | * | 4/1997 | Florin | H04N 5/4403 348/E5.103 |

(Continued)

FOREIGN PATENT DOCUMENTS

| EP | 1667444 A1 | 6/2006 |
| WO | WO2009/032998 | 3/2009 |

OTHER PUBLICATIONS

Betge et al., "Visual Tracking of Body Features to Provide Computer Access for Pecipte With Severe Disabitities", IEEE, vol. 10, No. 1, Mar. 2002, pp. 1-10.

(Continued)

*Primary Examiner* — Nathan Flynn
*Assistant Examiner* — Tung T Trinh
(74) *Attorney, Agent, or Firm* — Jack Schwartz & Associates, PLLC

(57) ABSTRACT

A method and device for filtering a content menu. A list including two or more content items to be filtered is displayed. One or more selectable filters associated to a first hierarchy of filters are displayed. Responsive to detecting a first user input, a first filter in the first hierarchy of filters is selected, the list of content items is automatically filtered, and one or more selectable filters associated to a second hierarchy of filters is automatically provided. Responsive to detecting a second direction user input a second filter in the second hierarchy of filters is selected, the list of content items is automatically filtered according to the first and the second filters; and the filtered list of content items is displayed. The filtered list of content items includes a subset of the content items of the initially displayed list of content items.

24 Claims, 5 Drawing Sheets

(51) Int. Cl.
*H04N 21/422* (2011.01)
*H04N 21/431* (2011.01)
*H04N 21/442* (2011.01)
*H04N 21/472* (2011.01)
*H04N 21/84* (2011.01)

(52) U.S. Cl.
CPC ... *H04N 21/4312* (2013.01); *H04N 21/44218* (2013.01); *H04N 21/47202* (2013.01); *H04N 21/4828* (2013.01); *H04N 21/84* (2013.01); H04N 2005/44556 (2013.01)

(58) Field of Classification Search
USPC .......................................................... 725/44
See application file for complete search history.

(56) References Cited

U.S. PATENT DOCUMENTS

| | | | |
|---|---|---|---|
| 6,910,191 B2* | 6/2005 | Segerberg | H04N 5/44543 348/E5.105 |
| 7,580,932 B2 | 8/2009 | Plastina et al. | |
| 7,752,564 B2 | 7/2010 | Billmaier et al. | |
| 2002/0194591 A1* | 12/2002 | Gargi | H04N 5/44591 725/32 |
| 2003/0052905 A1* | 3/2003 | Gordon et al. | 345/700 |
| 2003/0090524 A1* | 5/2003 | Segerber | H04N 5/44543 715/786 |
| 2004/0218104 A1 | 11/2004 | Smith et al. | |
| 2005/0108748 A1* | 5/2005 | Nishikawa | H04N 7/163 725/38 |
| 2007/0061023 A1* | 3/2007 | Hoffberg et al. | 700/83 |
| 2007/0277201 A1 | 11/2007 | Wong et al. | |
| 2008/0063381 A1* | 3/2008 | Conroy | G11B 27/034 386/234 |
| 2009/0322676 A1* | 12/2009 | Kerr | G06F 3/0346 345/158 |
| 2010/0023862 A1* | 1/2010 | Tai | G06F 17/30247 715/721 |
| 2010/0077334 A1 | 3/2010 | Yang et al. | |
| 2010/0225668 A1 | 9/2010 | Tatke | |
| 2010/0229119 A1 | 9/2010 | Sawyer | |

OTHER PUBLICATIONS

EP Search Report dated Jun. 7, 2011.
Margrit Betke et al. "The Camera Mouse: Visual Tracking of Body Features to Provide Computer Access for People with Severe Disabilities", IEEE Transactions on Neural Systems and Rehabilitation Engineering vol. 10, No. 1, Mar. 2002, pp. 1-10, 1534-4320/02, 2002 IEEE.

* cited by examiner

SETTING A FEATURE FROM THE MAIN MENU OF AN APPLICATION

This application claims the benefit, under 35 U.S.C. §119 of EP Patent Application 10306489.5, filed 22 Dec. 2010.

FIELD OF THE INVENTION

The present invention relates to a method for filtering a content menu of a receiver for audio/video content.

BACKGROUND OF THE INVENTION

In current applications, i.e. in a receiver for digital audio/video content, a feature setup is done in a page of the user menu, wherein that page represents the functionality of the feature. Feature setup does mean e.g. the definition of user profiles, the definition of settings of a settop box or the definition of an electronic program guide filter function or a search function. In known devices, a popup contextual menu or a dedicated area on a screen is used for this feature setup. Typically, on a page from a video on demand (VoD) catalogue, filtering options are available in the catalogue itself. Thus, a user first has to navigate to the VoD page and select this page, and afterwards a dedicated menu is presented for selecting and buying a video. The menu is dedicated and opened in the video on demand content. In a remote control as known in the art, specific control buttons exist for navigating in these menus. For a video on demand menu, a "buy" button may exist. For a teletext (videotext) menu, specific buttons exist for fast navigation (usually a red, green, yellow and blue button), a button for switching on and off the teletext, as well as a button for displaying the teletext in a transparent manner in front of the respective program. These dedicated control buttons make a remote control complicated and with increasing functionality of a receiver device, the number of buttons needed on the remote control also increases. In addition, in a gesture control device or gyroscopic device, in general no or only a few buttons are foreseen.

On the other hand, in some devices the dedicated menu buttons are displayed on the screen when a user has activated the corresponding menu and the user navigates using the arrow keys of his remote control ("→", "↑", "↓", "←") and the "ok" button for virtually pressing the keys presented on the screen.

Displaying dedicated buttons on the screen is uncomfortable for the user in case a gesture control or gyroscopic control is used, because pointing at a specific area on the screen is not possible in this case. In a gesture control or gyroscopic control, the controlling and command functionality is realized by movements. These movements are transformed into specific commands. Thus, a menu is needed which can be operated with such a control.

SUMMARY OF THE INVENTION

One problem solved by the invention is to find a way of remote controlling of a multimedia receiver having increased functionality such as filtering functionality for EPGs without the need of many buttons on the remote control.

According to the invention, a method for filtering a content menu containing a list of items is proposed. The method contains the steps of:
  detecting a first direction user input;
  selecting a first filter value in a first hierarchy in response to the detected direction;
  automatically memorizing the first filter value and filtering the content menu according to the first filter value;
  automatically providing at least second filter values to be selected;
  detecting at least a second direction user input;
  selecting at least a second filter value in response to the detected at least second direction;
  automatically memorizing the at least second filter value and filtering the content menu according to the first and the second filter value,
  displaying the filtered content.

This has the advantage that it allows users to use new means of interaction with the user interface such as a gyroscopic control or a gesture control without sacrificing ergonomy, and even have a very intuitive application setting that is always present at the same place. The same type of movement is used for control, independently of the type of menu which is controlled. Another major advantage of the inventive method is to enable the feature itself to use any visible space available. Thus, the method reduces the space needed to display contents and it introduces new navigation concepts, which may not be consistent with the global application concepts. Further, the global navigation consistency is improved as navigation is performed in the hierarchy level of the main menu.

According to the invention, the method is applied in case of a device which is controlled by gesture control. Examples for gesture control are gyroscopic control, tracking of the movements of the user's hands or fingers, e.g. by a camera or by a touch screen on which the user moves his fingers. In case of gesture control, only a few buttons are available. Unlike a traditional remote control, no buttons are provided for dedicated menus, e.g. a separate teletext button or navigation buttons (red, green, blue, yellow) for the teletext menu. Thus, a user interface must be operable using only standard functions, which are available in the main menu. The invention has the advantage that for an electronic program guide or for a library for video on demand content no dedicated menus are needed, because the whole control is exported to the main menu and the user interface is consistent with the main menu functions. In addition, the invention has the advantage that there is no need to present these specific buttons virtually on the screen. This is advantageous, because in case a gesture control is used, it is almost impossible for a user to press a specific button displayed on the screen using his gesture control device. In case of a gesture control, a direction to which a user points can be easily recognized but no specific point can be pointed at. The invention provides an interface which can be operated just by interpreting the directions in which a user moves his hand or control device.

Advantageously, the method is used for filtering the content menu in an electronic program guide or video on demand library.

The invention further concerns a control device for filtering a multimedia content menu. The content menu contains a list of items to be filtered. The control device comprises:
  a first filter for filtering the content menu according to a first filter value in a first hierarchy, the first filter value being selected by indicating a direction;
  a second filter for filtering the content menu according to a second filter value in a second hierarchy, the second filter value being selected by indicating a direction;
  a display device for displaying the filtered content menu.

Advantageously, the filters are displayed using a 3D representation on different level of depth for including and excluding filters and activating or inactivating settings.

The invention is described below using an electronic program guide received by a broadcasting receiver as an example. It is apparent to a person skilled in the art that the invention is applicable within program guides for other applications.

For better understanding the invention shall now be explained in more detail in the following description with reference to the figures. It is understood that the invention is not limited to this exemplary embodiment and that specific features can also expediently be combined and/or modified without departing from the scope of the present invention.

DETAILED DESCRIPTION OF PREFERRED EMBODIMENTS

Figure 1:
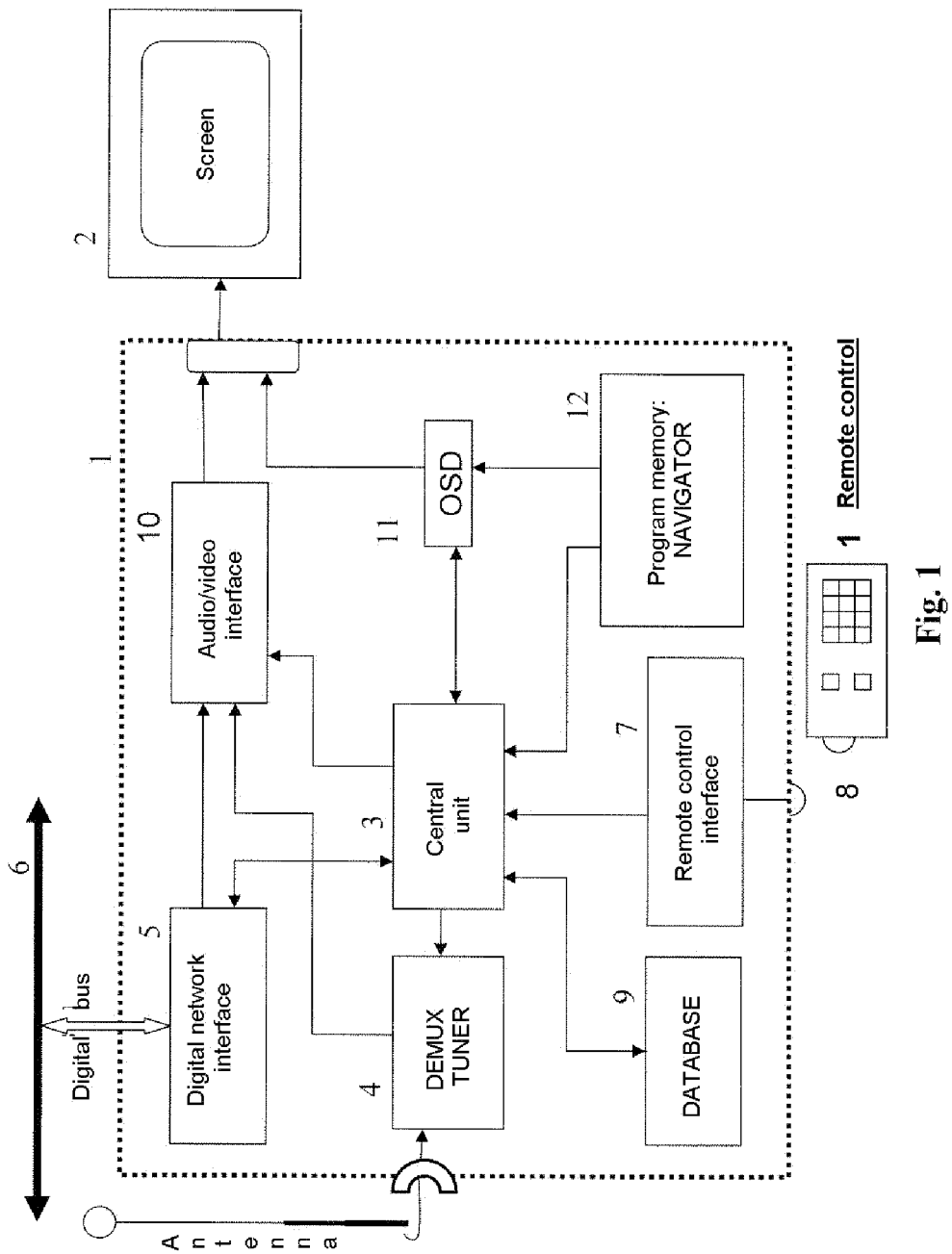
FIG. 1 schematically shows a television receiver.

FIG. 1 schematically depicts a television or multimedia receiver 1 connected to a display device 2. The receiver 1 comprises a central unit 3 linked to a program memory 12, and an interface 5 for communication with a high bit rate local digital bus 6 making it possible to transmit audio/video data in real time. This network is for example an IEEE 1394 network. The receiver 1 receives audio/video data from a broadcasting network through a reception antenna associated with a demodulator 4. The receiver 1 furthermore comprises a remote control interface, here an infrared signal receiver 7, for receiving the signals from a remote control 8, a memory 9 for storing a database, and an audio/video decoding logic 10 for creating audiovisual signals to be sent to the display device 2.

The receiver 1 also comprises a circuit 11 for displaying data on the screen, often called the OSD circuit, the initials standing for "On Screen Display". The OSD circuit 11 is a text and graphics generator which enables menus and pictograms (for example, a number corresponding to the station displayed) to be displayed on the screen of the display device 2 and which enables the navigation menus in accordance with the present invention to be displayed. The OSD circuit 11 is controlled by the Central Unit 3 and a navigator 12' present in the program memory 12. The navigator 12' is advantageously made in the form of a program module recorded in a read only memory. It may also be embodied in the form of a custom circuit of ASIC type for example.

Via the digital bus 6 and/or the broadcasting network the receiver 1 receives data comprising multimedia documents and descriptive data pertaining to these documents. These data originate either from a broadcasting network, or from the digital network 6. The descriptive data comprise classification elements also called "attributes", for the accessible multimedia documents. The descriptive data are for example contained in the service information specified in the DVB-SI Standard. These data are stored in the database of the memory 9 of the receiver 1 and are continuously updated. The navigator 12' thereafter extracts the information from this database and processes it to produce the navigation menus displayed on the screen of the display device 2.

Figure 2:
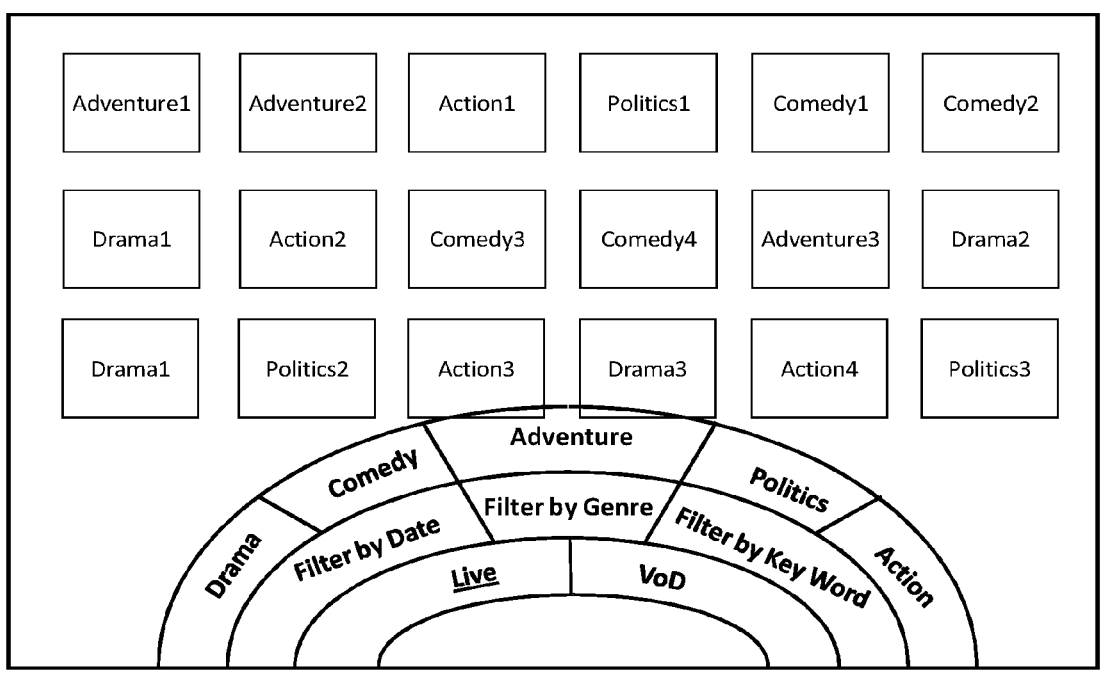
FIG. 2 shows an electronic program guide including a content menu to be filtered

FIG. 2 shows an electronic program guide. Movies which are already broadcasted or broadcasted soon are presented and are categorized according to different genres (Action, Adventure, Comedy, Drama, Politics). In the same way, a video on demand library can be presented for downloadable content. It goes without saying that information regarding the movies, e.g. broadcasting times, actors and parental information may also be presented. In addition, a menu is shown for setting up filter values. A user might select between live content "Live" and video on demand content "VoD". The selection is made using a gesture control. The device interprets the direction in which the user points with his hand or with a gesture control device. In FIG. 2, a movement in left or left-up direction is interpreted as selection of "Live", a movement in right or right-up direction is interpreted as the selection of "VoD". If a category is selected accordingly, the content is filtered and the filtered content is displayed. Thus, in FIG. 2 all live content is displayed. Of course, the respective selection can also be made by the arrow keys of a traditional remote control.

Figure 3:
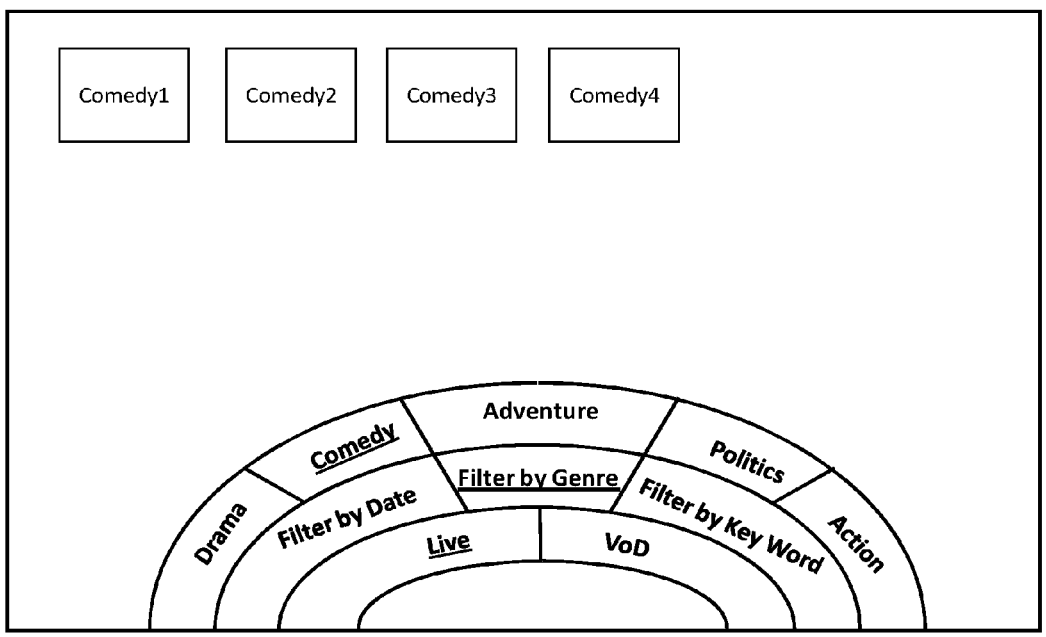
FIG. 3 shows an electronic program guide including a filtered content menu

In a next step, the user selects a further filter, e.g. "Filter by Date", "Filter by Genre", "Filter by Keyword". This is again done by gesture control or by a traditional remote control. In case of a gesture control, a movement in left direction selects "Filter by Date", a movement in up direction selects "Filter by Genre" and a movement in right direction selects "Filter by Keyword". If the filter by genre category is selected, the user selects the genre accordingly. In FIG. 3, a content menu is presented which has been filtered according to the filter values "Live", "Filter by Genre" and "Comedy". Thus, only live programs which relate to comedy are presented.

Thus, FIGS. 2 and 3 show that the setting of the application is outsourced to the main menu of the application. The concept which is proposed allows outsourcing all settings of all the functionality of an application in the main menu. By default, when the user requests the menu, it will open with the current application setting. From there, the user can parameter its functionality: for example the user is able to select active filters for the video catalogue. In FIG. 3, filters "Live", "Filter by Genre" and "Comedy" are selected. The changes of the new settings, e.g. the new filter options and the new filtered content are immediately visible on the screen, as the filter menu and the presented content are visible at the same time on the screen menu. The selected filters are underlined in FIG. 3. Alternatively, marking of selected filters with a specific colour or bold is foreseen.

In FIGS. 2 and 3, the gyroscopic remote control is given as an example because it only allows basic moves to navigate. However, for ergonomic purposes, the user interface portal is also usable using up-down-left-right keys (other ones should be used as shortcuts or advanced controls). A simple navigation is generally implemented in the main menu. Moving all controls (content filtering, search, definition of settings) in this menu simplifies the handling and takes advantage of the existing simple menu navigation. The invention is applicable to many systems, thus the receiver for audio/video content of FIG. 1 is only an example.

Figure 4:
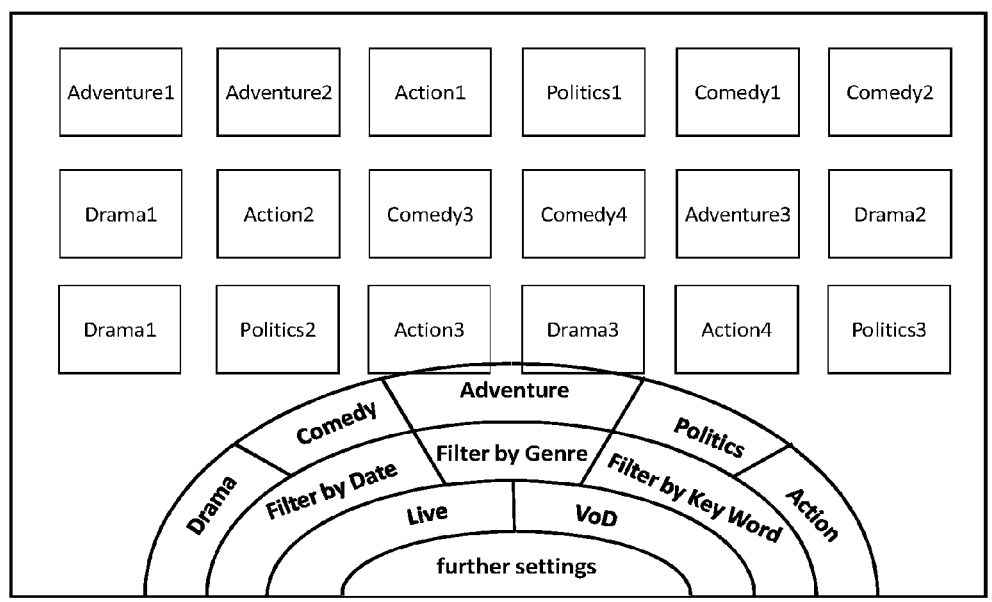
FIG. 4 shows an electronic program guide including a filtered content menu.
Figure 5:
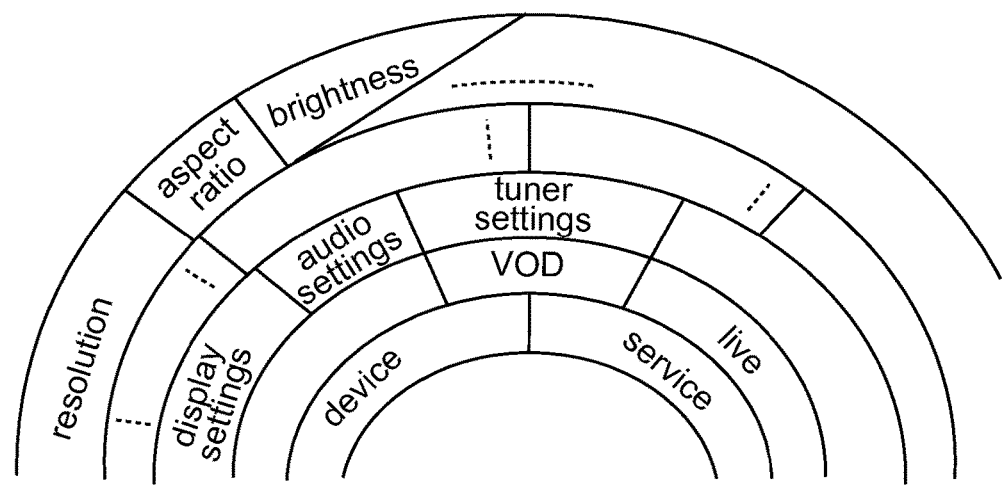
FIG. 5 shows a menu navigation tree through which a user can navigate.

In other words, according to the invention, when the user requests to see the menu, then there is not a menu structure tree trough which the user has to navigate before he can actually see and access the items to be selected, but he sees immediately the current settings of the device, and can then navigate starting from the current point in the navigation tree. He does not have to start at the root of the navigation tree. When the user activates the menu, the menu displayed shows the 'actual branch of a tree, together with the leaves' in which the device is currently in—namely, the current settings. If the user wants to access another branch, he can do this by 'climbing down' and then 'climbing up' to another branch. In FIG. 4, the lowest part of the menu shows the entry "further settings" which leads to a lower part of the tree, from which other main branches may be reached. Such main branches are e.g. "display settings". In FIG. 5, the "display settings" menu "video resolution", "aspect ratio", "brightness", etc. are selectable. Other main branches are, e.g. "tuner settings", "audio settings", etc. The branch actually shown when menu access is requested is preferably the one last branch navigated to during the last use of the menu. Another possibility is to start at a defined 'branch of highest interest', preferably the one shown in FIGS. 2-4.

In FIG. 2-3, three levels of branches (first level: Live, VoD; second level: Filter by Date, Filter by Genre, Filter by Key Word; third level: Drama, Comedy, Adventure, Politics, Action) and the leaves (Comedy1, Comedy2, Comedy3, Comedy4 in FIG. 3) are shown, however, also more or less branches might be shown at the same time. Nevertheless, it was found that showing three branches is most user friendly, in case a display device having an aspect ration of 4:3 or 16:9 as known in the art is used.

Figure 6:
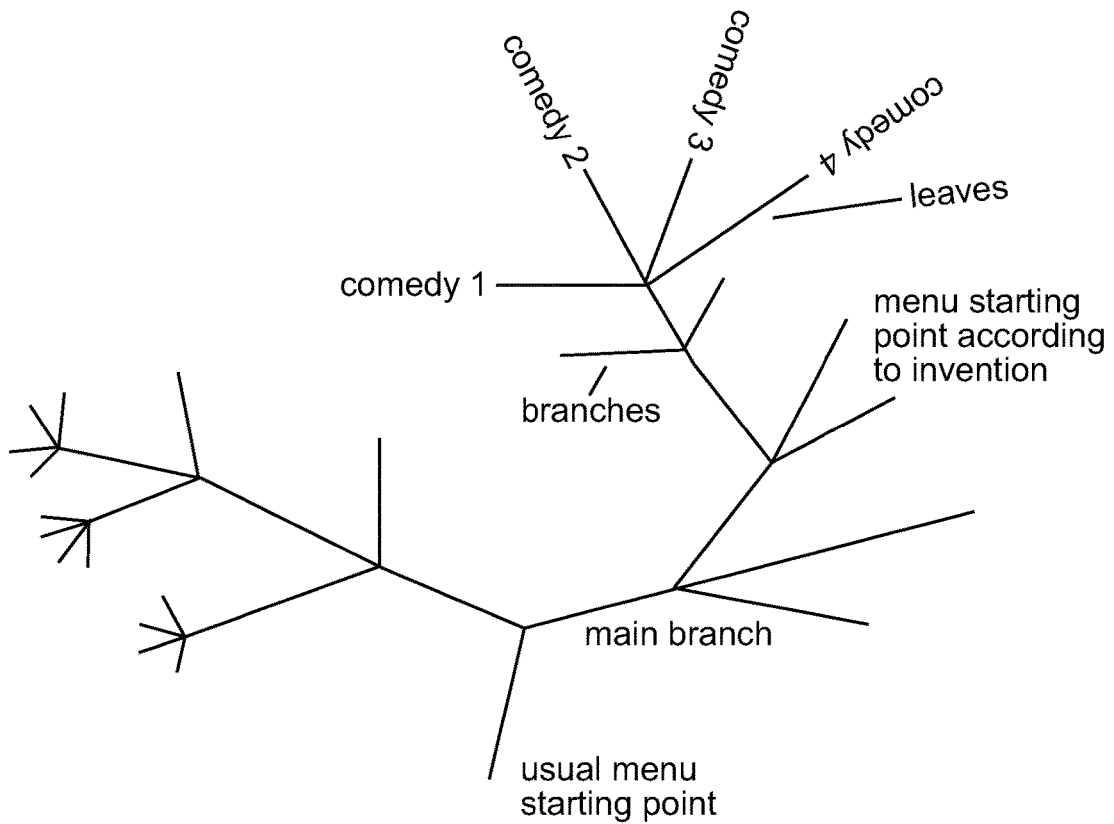
FIG. 6 shows the structure of a whole navigation tree.

When the user navigates downwards, the upper branches preferably move also upwards and are reduced in size. Advantageously, the user can 'freeze' a complete view, which means that the whole tree is displayed, as depicted in FIG. 5. The structure of a whole tree is depicted in FIG. 6. This tree is displayed in 'freeze' mode completely, as indicated in FIG. 5, even not all leaves and branches are given for clarity reasons. Thus, the user is able to see each and every possible selection he can make. Advantageously, in case the menu tree is too big to display every leave with a comfortable font size, a zoom function is available in 'freeze' mode to move up and down the menu tree and display a certain part of the tree in a bigger style, while still displaying the whole menu tree.

What is claimed is:

1. A method for filtering a content menu, wherein the method comprises:
    displaying, on a display, a list of content items to be filtered, the list of content items comprising two or more content items;
    displaying one or more selectable filters associated to a first hierarchy of filters for filtering the list of content items, each of the one or more selectable filters being identified on the display by a sector of a concentric band, selectable filters of a same hierarchy belonging to a same concentric band;
    detecting movement in a first direction input associated with a first filter, said movement in the first direction being within a first sector associated with said first filter;
    responsive to detecting the movement in the first direction input, performing:
        selecting the first filter in the first hierarchy of filters;
        automatically filtering the list of content items according to the selected first filter to generate a first subset of content items associated with the selected first filter;
        automatically providing one or more second selectable filters forming a second hierarchy of filters for filtering the first subset of content items; and
        displaying, on the display, the first subset of content items, and the first and second hierarchy of filters;
    detecting movement in a second direction input, said movement in the second direction being within a second sector associated with said second filter;
    responsive to detecting the movement in the second direction input associated with a second filter, performing:
        selecting the second filter in the second hierarchy of filters;
        automatically filtering the list of content items according to the selected first filter and second filter to generate a second subset of content items associated with the selected first and second filters;
        automatically providing one or more third selectable filters forming a third hierarchy of filters for filtering the second subset of content items; and
        displaying, on the display, the second subset of content items along with the first, second and third hierarchy of filters.

2. The method according to claim 1, wherein the first and second direction input are indicated by using a gesture control device.

3. The method according to claim 2, wherein the gesture control device is a gyroscopic control device.

4. The method according to claim 2, wherein the gesture control device tracks movements of hands or fingers.

5. The method according to claim 4, wherein the movements of the hands or fingers are tracked using a camera.

6. The method according to claim 4, wherein the movements of the hands or fingers are tracked using a touch screen.

7. The method according to claim 1, wherein the content menu is an electronic program guide.

8. The method according to claim 1, wherein the content menu is a video on demand library.

9. The method according to claim 3, wherein the content menu is an electronic program guide.

10. The method according to claim 3, wherein the content menu is a video on demand library.

11. The method according to claim 4, wherein the content menu is an electronic program guide.

12. The method according to claim 4, wherein the content menu is a video on demand library.

13. A control device for filtering a content menu, the control device comprising:
    an on-screen display circuit configured to display a list of content items to be filtered, the list of content items comprising two or more content items, and to display one or more selectable filters associated to a first hierarchy of filters for filtering the list of content items; each of the one or more selectable filters being identified on the display by a sector of a concentric band, selectable filters of a same hierarchy belonging to a same concentric band;
    a remote control interface configured to detect movement in a first direction input and movement of in a second direction input; and
    a central unit configured to, responsive to detecting the first direction input associated with a first filter, said movement in the first direction being within a first sector associated with said first filter, perform:
        selecting the first filter in the first hierarchy of filters;

automatically filtering the list of content items according to the selected first filter to generate a first subset of content items associated with the selected first filter;
instructing the on-screen display circuit to provide one or more second selectable filters forming a second hierarchy of filters for filtering the first subset of content items; and
instructing the on-screen display circuit to display the first subset of content items, and the first and second hierarchy of filters;
wherein the central unit is further configured to, responsive to detecting movement of in the second direction input associated with a second filter, said movement in the second direction being within a second sector associated with said second filter, perform:
selecting the second filter in the second hierarchy of filters;
automatically filtering the list of content items according to the selected first filter and second filter to generate a second subset of content items associated with the selected first and second filters;
automatically providing one or more third selectable filters forming a third hierarchy of filters for filtering the second subset of content items; and
instructing the on-screen display circuit to display the second subset of content items along with the first, second and third hierarchy of filters.

14. The device according to claim 13, wherein the first and second direction input received from a user using a gesture control device.

15. The device according to claim 14, wherein the gesture control device is a gyroscopic control device.

16. The device according to claim 14, wherein the gesture control device tracks movements of hands or fingers.

17. The device according to claim 16, further comprising a camera for tracking the movements of the hands or fingers.

18. The device according to claim 16, further comprising a touch screen for tracking the movements of the user's hands or fingers.

19. The device according to claim 13, wherein the content menu is an electronic program guide.

20. The device according to claim 13, wherein the content menu is a video on demand library.

21. The device according to claim 15, wherein the content menu is an electronic program guide.

22. The device according to claim 15, wherein the content menu is a video on demand library.

23. The method according to claim 16, wherein the content menu is an electronic program guide.

24. The device according to claim 16, wherein the content menu is a video on demand library.

* * * * *